United States Patent Office 3,185,690
Patented May 25, 1965

3,185,690
2-CHLORO-4-AMINO-5-FLUOROPYRIMIDINE
Robert Duschinsky, Essex Fells, N.J., assignor to Hoffmann-La Roche Inc., Nutley, N.J., a corporation of New Jersey
No Drawing. Original application June 3, 1959, Ser. No. 817,736, now Patent No. 3,040,026, dated June 19, 1962. Divided and this application Sept. 14, 1961, Ser. No. 137,991
1 Claim. (Cl. 260—256.4)

This application is a division of U.S. Patent application Serial No. 817,736, filed June 3, 1959, in the name of Robert Duschinsky, now U.S. Patent No. 3,040,026.

This invention relates to novel chemical methods, and to novel intermediates therefor. More particularly, in one of its aspects, it relates to methods for the preparation of 1-(2'-deoxy-D-ribofuranosyl)-5-fluorocytosine, especially 2-deoxy-5-fluorocytidine and its α-anomer, and to intermediates useful in practicing said methods. 2'-deoxy-5-fluorocytidine is a known compound, useful inter alia as an antibacterial and antifungal agent and as an antimetabolite. In another of its aspects, the invention relates to methods of preparing 5-fluorocytosine, and to intermediates useful in practicing said methods. 5-fluorocytosine is also a known compound, useful inter alia as an antimetabolite and as an intermediate for the preparation of other useful compounds, e.g. 2'-deoxy-5-fluorocytidine.

In one of its comprehensive embodiments, the invention relates to processes of making 1-(2'-deoxy-D-ribofuranosyl)-5-fluoro-cytosine which comprise reacting 5-fluorocytosine with a mercuric salt, thereby forming 5-fluorocytosine-monomercury, reacting the latter with 2-deoxy-3,5-diaroyl-D-ribofuranosyl halide, thereby forming 1-(2'-deoxy - 3',5'-diaroyl-D-ribofuranosyl)-5-fluorocytosine, and hydrolyzing the latter. Especially preferred in the above processes are those embodiments wherein the aryl portion of the aroyl radicals referred to contains not more than ten carbon atoms and is selected from the group consisting of phenyl, (lower alkyl)phenyl, (lower alkoxy)phenyl, halophenyl and nitrophenyl; e.g., p-tolyl or p-chlorophenyl; and the halide referred to is chloride or bromide. Illustrative mercuric salts of organic carboxylic acids which can be employed include mercuric formate, mercuric acetate, mercuric benzoate and the like. Mercuric chloride can also be used. However, mercuric acetate is preferred. A preferred embodiment of this branch of the invention relates to a process which comprises reacting 5-fluorocytosine with mercuric acetate, thereby forming 5-fluorocytosine-monomercury; reacting the latter with 2-deoxy-3,5-di(p-toluoyl)-D-ribofuranosyl chloride, thereby forming 1-(2'-deoxy-3',5'-[p-toluoyl] - D - ribofuranosyl)-5-fluorocytosine; and hydrolyzing the latter with alkali, thereby forming 1-(2'-deoxy-D-ribofuranosyl)-5-fluorocytosine.

In another of its comprehensive embodiments, the invention provides a process of making 5-fluorocytosine, useful as a starting material in the processes described above, which comprises reacting 5-fluorouracil with a chlorinating agent, thereby forming 2,4-dichloro-5-fluoropyrimidine; reacting the latter with ammonia, thereby forming 2-chloro-4-amino-5-fluoropyrimidine; and hydrolyzing the latter. A preferred embodiment of this branch of the invention comprises reacting 5-fluorouracil with phosphorus oxychloride in the presence of an acid acceptor, preferably a tertiary organic base, thereby forming 2,4-dichloro-5-fluoropyrimidine; reacting the latter with ammonia under mild conditions (e.g. by reacting at room temperature a solution of 2,4-dichloro-5-fluoropyrimidine in a lower alkanol, such as ethanol, with aqueous ammonia, which under these conditions can be present even in excess), thereby forming 2-chloro-4-amino-5-fluoropyrimidine; and treating the latter with a strong mineral acid (e.g. concentrated hydrochloric acid), thereby forming 5-fluorocytosine.

In an embracive embodiment, therefore, the invention provides processes of making 1-(2'-deoxy-D-ribofuranosyl)-5-fluorocytosine which comprise chlorinating 5-fluorouracil, thereby forming 2,4-dichloro-5-fluoropyrimidine; reacting the latter with ammonia, thereby forming 2-chloro-4-amino-5-fluoropyrimidine; hydrolyzing the latter, thereby forming 5-fluorocytosine; reacting the latter with a mercuric salt, thereby forming 5-fluorocytosine-monomercury; reacting the latter with 2-deoxy-3,5-diaroyl-D-ribofuranosyl halide, thereby forming 1-(2'-deoxy-3',5'-diaroyl-D-ribofuranosyl)-5-fluorocytosine; and dearoylating the latter.

The processes described above are illustrated graphically in the following diagrammatic flowsheet, wherein the symbol R represents an aryl radical containing not more than ten carbon atoms selected from the group consisting of phenyl, (lower alkyl)-phenyl, (lower alkoxy)phenyl, halophenyl and nitrophenyl:

FLOWSHEET

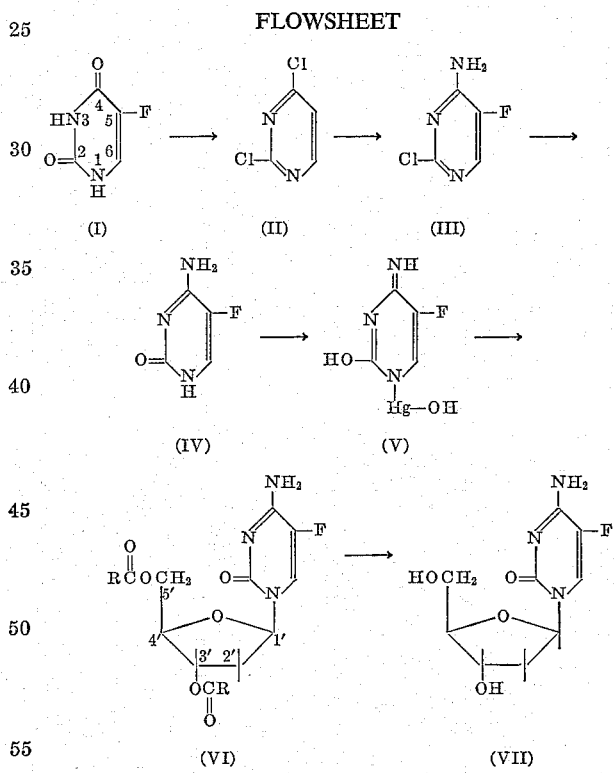

The first stage of the embracive embodiment referred to above (i.e. I→II) comprises dichlorinating 5-fluorouracil (I). This stage is conveniently effected by treating 5-fluorouracil with a conventional phosphorus-containing chlorinating agent. Preferably phosphorus oxychloride is employed, but phosphorus pentachloride can also be employed. The reaction is conveniently effected by heating the reactants together, while agitating well, in the presence of a tertiary organic base as acid aceptor, e.g. dimethylaniline or diethylaniline. An inert organic solvent can be employed if desired, but its use is not necessary.

The second stage (II→III) is conveniently effected by dissolving 2,4-dichloro-5-fluoropyrimidine (II) in a lower alkanol solvent, conveniently ethanol, and allowing the solution to stand with aqueous or alcoholic ammonia until the amination reaction has proceeded to the desired extent. The reaction is followed by volumetric titration of chloride ion produced by the reaction, and the end point is signalized by determination of one atom-proportion of chloride ion in the reaction mixture.

The stage (III→IV) is effected by hydrolyzing 2-chloro-4-amino-5-fluoropyrimidine to produce 5-fluorocytosine. A convenient method comprises hydrolysis with a strong mineral acid, preferably by heating the starting material with concentrated hydrochloric acid. The reaction is carried on until the desired degree of hydrolysis has taken place. A convenient method of determining the end point is by means of ultraviolet spectrophotometry, using the absorption characteristics of an authentic specimen of 5-fluorocytosine as a standard.

The next stage (IV→V) is conveniently effected by heating a solution of 5-fluorocytosine in water with a solution of mercuric acetate in methanol. Mercuric chloride can also be employed. Also, mercuric salts of other organic acids can be employed, e.g. mercuric benzoate. The 5-fluorocytosine-monomercury produced is difficult to obtain in filterable form. It can be converted to filterable form by boiling with water. It will be understood that the monomercury product obtained is more or less hydrated, as shown by its alkaline reaction to litmus. A portion of the combined water can be removed by drying.

In effecting the transformation (V→VI), 5-fluorocytosine-monomercury is first suspended in an inert organic solvent, e.g. benzene, toluene or dimethylformamide. When toluene is employed, it is usually convenient to distill off a portion of the solvent in order to insure removal of water. The aroylating agent, conveniently 2-deoxy-3,5-di(p-toluoyl)-D-ribofuranosyl chloride or 2-deoxy-3,5-di(p-chlorobenzoyl)-D-ribofuranosyl chloride, is added to the solution, and the reactants are heated until no further dissolution of the mercury compound is observed.

The final step, dearoylation (VI→VII), can be effected by conventional saponification methods using alcoholic alkalies, e.g. ethanolic sodium hydroxide, methanolic sodium methoxide, ethanolic ammonia, ethanolic barium ethylate, and the like.

Those skilled in the art will understand that, whereas the compound 5-fluorocytosine-monomercury represented graphically above in Formula V is shown in a particular monomeric form, the compound can also exist in tautomeric and polymeric forms, as well as in forms which are hydrated to greater or less degree. All of these forms are included in the invention. Thus, Formula V represents the compound in a fully hydrated form and as containing only a single mercury atom, i.e. in this instance a monomeric compound; but the invention also includes less hydrated forms, and dimeric and polymeric forms containing per molecule two or more mercury atoms, respectively; however, still containing mercury in the ratio of one atom per pyrimidine nucleus.

The starting material 5-fluorouracil (Formula I) is a known compound and does not per se form part of the present invention. The 2-deoxy-3,5-diaroyl-D-ribofuranosyl halides required as reactants for converting compounds of Formula V to those of Formula VI have also been described prior to the present invention, and do not per se form a part thereof. For convenience of reference, the preparation of 2-deoxy-3,5-di(p-toluoyl)-D-ribofuranosyl chloride, employed as a reactant in Examples 5 and 6 below, is described herein:

*Preparation of 2-deoxy-3,5-di(p-toluoyl)-D-ribofuranosyl chloride.*—13.6 g. of 2-deoxy-D-ribose was dissolved in 245 ml. of methanol and 27 ml. of a 1% solution of anhydrous hydrogen chloride in methanol was added. The mixture was allowed to stand for 20 minutes at 27° C. and then was stirred with 5 g. of silver carbonate until it no longer reacted acidic. The silver salts were removed by filtration with suction and were washed with methanol. The combined filtrate and washings were evaporated in a vacuum as far as possible, 20 ml. pyridine was added and the solution was again evaporated in a vacuum in order to remove the last traces of methanol.

The syrup residue of 2-deoxy-1-methyl-D-ribofuranoside was then dissolved in 80 ml. of dry pyridine, the solution was cooled to approximately 0° C., and 34 g. of p-toluoyl chloride was added in portions while maintaining the temperature below 20° C. After the addition of the chloride, the temperature was allowed to rise to 40–45° C. and kept there for two hours. The mixture was diluted with 500 ml. of water, the oily precipitate was shaken out with 200 ml. of ether, the ether layer was washed successively with water, KHSO$_4$ solution, water, KHCO$_3$ solution, and water again, and was then dried over anhydrous sodium sulfate. The ether was removed by evaporation in a vacuum and the remaining syrup of 2-deoxy-3,5-di(p-toluoyl)-1-methyl-D-ribofuranoside was dissolved in 20 ml. of acetic acid while warming. The solution was cooled to below 10° C., and 80 ml. of a saturated solution of anhydrous hydrogen chloride in acetic acid was added at 0–10° C. Anhydrous hydrogen chloride was conducted into the solution for a few minutes, whereupon the product crystallized rapidly, filling the whole vessel. After 10 minutes, the crystals were filtered by suction. The filter cake was slurried with 100 ml. of ice-cold absolute ether, the slurry was filtered with suction, and the filter cake was rapidly transferred into a vacuum desiccator and dried in a vacuum over soda lime at room temperature, yielding dry, crystalline 2-deoxy-3,5-di(p-toluoyl)-D-ribofuranosyl chloride.

Similarly for convenience of reference, the preparation of 2-deoxy-3,5-di(p-chlorobenzoyl)-D-ribofuranosyl chloride, employed as a reactant in Example 7 below, is described herein:

*Preparation of 2-deoxy-3,5-di(p-chlorobenzoyl)-D-ribofuranosyl chloride.*—3.5 g. of dry crystalline 2-deoxy-D-ribose was dissolved in 63 ml. of methanol and 7 ml. of a 1% solution of anhydrous hydrogen chloride in methanol was added. The mixture was allowed to stand for 20 minutes at 27° C. Five g. of silver carbonate was added and the mixture was stirred thoroughly. The silver salts were removed by filtration. The methanol was distilled off in a vacuum as completely as possible. The residue was diluted with 10 ml. of anhydrous pyridine, and the solution was again evaporated in a vacuum in order to remove the last traces of methanol.

The oily residue, crude 1-methyl-2-deoxy-D-ribofuranoside, was dissolved in 20 ml. of anhydrous pyridine and 8 ml. of p-chlorobenzoyl chloride was added in portions while cooling with ice water to maintain the temperature between 20° and 40° C. The mixture was allowed to stand overnight, water and methylene chloride were added, the layers were separated, and the methylene chloride layer was washed successively with KHSO$_4$ solution and water, dried over sodium sulfate and finally evaporated in a vacuum.

The syrupy residue, 1-methyl-2-deoxy-3,5-di(p-chlorobenzoyl)-D-ribofuranoside, was dissolved in 20 ml. of acetic acid and 50 ml. of a cold saturated solution of anhydrous hydrogen chloride in 100 ml. acetic acid was added at 10–15° C. Crystallization of 2-deoxy-3,5-di(p-chlorobenzoyl)-D-ribofuranosyl chloride occurred.

The invention is further disclosed in the following examples, which are illustrative but not limitative thereof.

*Example 1.—2,4-dichloro-5-fluoropyrimidine* (II)

A mixture of 104 g. (0.8 mol) of 5-fluorouracial (Formula I), 1472 g. (9.6 mols) of phosphorus oxychloride and 166 g. (1.37 mols) of dimethylaniline was stirred under reflux for two hours. After cooling to room temperature, phosphorus oxychloride was removed by distillation at 18–22 mm. and 22–37° C. The residue was then poured into a vigorously stirred mixture of 500 ml. of ether and 500 g. of ice. After separating the ether layer, the aqueous layer was extracted with 500 ml., then 200 ml. of ether. The combined ether fractions were dried over sodium sulfate, filtered, and the ether removed by vacuum distillation at 10–22° C. The residue, a yellow solid melting at 37–38° C. weighed 120 g. corresponding to a 90% yield. Vacuum distillation of 115 g. of this material at 74–80° C. (16 mm.) gave 108 g. of white solid melting at 38–39° C. corresponding to an 84.5% yield.

Analysis.—Calculated for $C_4HN_2Cl_2F$: C, 28.70; H, 0.60; N, 16.75; Cl, 42.47; F, 11.38. Found: C, 28.77; H, 0.82; N, 17.01; Cl, 42.25; F, 11.66.

*Example 2.—2-chloro-4-amino-5-fluoropyrimidine (III)*

To a solution of 10.0 g. (0.06 mol) of 2,4-dichloro-5-fluoropyrimidine in 100 ml. of ethanol, 25 ml. of concentrated aqueous ammonia were slowly added. A slightly opalescent solution resulted. The temperature gradually rose to 35° C. The solution was then cooled in ice to 18° C. and thereafter remained below 30° C. After three hours, a Volhard titration showed that 0.0545 mol of chlorine was present in ionic form. Storage in a refrigerator overnight resulted in some crystallization of ammonium chloride. A white sludge, resulting from the evaporation of the reaction mixture at 40° C., was slurried with 75 ml. of water, filtered and washed free of chloride. After drying in vacuo, the product melted at 196.5–197.5° C., yield 6.44 g.

Evaporation of the mother liquors yielded a second crop of 0.38 g., raising the total yield to 6.82 g. (79.3%).

Analysis.—Calculated for $C_4H_3N_3ClF$: C, 32.56; H, 2.05; N, 28.48; F, 12.88; Cl, 24.03. Found: C, 32.69; H, 2.25; N, 28.46; F, 13.02; Cl, 23.94.

*Example 3.—5-fluorocytosine (IV)*

A slurry of 34.0 g. (0.231 mol) of 2-chloro-4-amino-5-fluoropyrimidine in 231 ml. of concentrated hydrochloric acid was heated in a water bath at 93–95° C. for 125 minutes. The reaction was followed by means of ultraviolet spectrophotometry using the absorption at 245, 285, and 300 m$\mu$ as a guide. The absorption at 300 m$\mu$ rose to a maximum after 120 minutes and then dropped slightly. The clear solution was cooled at 25° C. in an ice bath, then evaporated to dryness under vacuum at 40° C. After slurrying with water three times and re-evaporating, the residue was dissolved in 100 ml. of water. To this solution, cooled in ice, 29 ml. of concentrated ammonia were added dropwise. The resulting precipitate was filtered, washed free of chloride with water, then with alcohol and ether. After drying in vacuo at 65° C., the product weighed 22.3 g.

An additional 6.35 g. was obtained by evaporation of the mother liquor, thus yielding a total of 28.65 g. (96.0%).

Anaylsis. — Calculated for $C_4H_4ON_3F$: N, 32.55. Found: N, 32.67.

*Example 4.—5-fluorocytosine-monomercury (V)*

Hot solutions of 6.38 g. (20 mM.) of mercuric acetate in 200 ml. of methanol and of 2.58 g. (20 mM.) of 5-fluorocytosine in 75 ml. of water were mixed. After cooling to 26° C., 20 ml. of 2 N NaOH were added slowly with stirring. The pH changed from 4.6 to 11.65 and a thick jelly-like precipitate formed. It became filterable only after addition of 200 ml. of methanol and 1250 ml. of ether. The precipitate, separated by filtration, was dispersed in 400 ml. of water, the suspension was boiled for five minutes and filtered hot. A waxy solid was obtained which became powdery upon drying in vacuo at 80° C. Yield, 6.07 g. This material, when placed upon moist litmus paper exhibits an alkaline reaction.

Analysis. — Calculated for $C_4H_4O_2N_3FHg$: N, 12.16. Found: N, 12.17, 11.99.

*Example 5.—2'-deoxy-5-fluorocytidine*

A suspension of 3.27 g. of 5-fluorocytosine-monomercury (containing 0.9 millimol of combined 5-fluorocytosine) in 125 ml. of toluene was dried by distilling off about 20 ml. of toluene. After cooling to room temperature 7.76 g. of 2-deoxy-3,5-di(p-toluoyl)ribofuranosyl chloride was added with stirring to the suspension. The well stirred mixture was brought to the boiling point within 10 minutes and boiled an additional 10 minutes, whereby 50 ml. of toluene was distilled off. The suspension cleared up somewhat at first, then a gum separated which finally was transformed into a granular deposit, which was separated by filtration from the hot toluene solution. It weighed 0.96 g. and contained unreacted 5-fluorocytosine determined spectrophotometrically (about 36% of the starting material was recovered).

The toluene filtrate upon cooling deposited gummy material which was separated by decantation. The supernatant solution was washed in a separatory funnel with 25 ml. of 25% potassium iodide solution and then three times with 10 ml. of water. This treatment produced additional gummy material.

All of the gummy material obtained was dissolved in about 20 ml. of chloroform, the chloroform solution was washed with 10 ml. of 25% potassium iodide and then with water, dried over sodium sulfate and evaporated in vacuo. The frothy residue (1.1 g.) was dissolved in 10 ml. of benzene. Addition of 50 ml. of petroleum ether to the well stirred benzene solution produced a precipitate which was first gummy and became granular upon continuous stirring. It was filtered off and washed with petroleum ether. Yield, 0.835 g. It was purified by dissolution in 7 ml. of benzene and reprecipitation with 200 ml. of petroleum ether to give 0.77 g. of a colorless powder (designated A), which comprised impure FCDR ("FCDR," i.e., "fluorocytosine deoxyriboside," is herein employed as an abbreviation designating a mixture consisting of the $\alpha$- and $\beta$-anomeric forms—i.e. 2'-deoxy-5-fluorocytidine and its $\alpha$-anomer).

The toluene solution, evaporated in vacuo to a volume of about 10 ml., deposited 100 mg. of crystals melting at 183° which were identified as p-toluic acid. The mother liquor upon evaporation gave a partially crystallizing oil (7.22 g.), which as taken up in 20 ml. of benzene and added dropwise with stirring to 300 ml. of petroleum ether to produce an almost colorless precipitate which was filtered, washed with petroleum ether and dried in vacuo. Yield, 3.21 g. This precipitate, designated (B), also comprised impure FCDR.

For the detoluoylation, 3 g. of the above mixture (B) was shaken for one hour with a mixture of 25 ml. of ethanol and 10 ml. of 2 N NaOH. Most of the material went into solution. After filtering, the solution was rendered Congo acid by addition of 1.8 ml. of concentrated hydrochloric acid, alcohol was removed by partial evaporation in vacuo and a precipitate of toluic acid was separated by filtration. The filtrate was extracted with 15+10+10 ml. of chloroform and excess of chloroform was removed by partial evaporation. The resulting yellowish solution (53 ml.) $\alpha_D^{26} = +0.17°$ (2 dm. tube) contained according to ultraviolet spectrophotometry 2.46 millimols of FCDR.

In the same manner, 0.74 g. of the mixture (A), isolated above, gave by hydrolysis with a mixture of 25 ml. of ethanol and 5 ml. of N NaOH, followed by acidification with 5.1 ml. of N HCl and extraction of the toluic acid with chloroform, 10.2 ml. of a solution containing, according to spectrophotometry, 1.03 millimols of FCDR.

The FCDR solutions were further purified by chromatography on "Dowex" 50–X8 (Dow Chemical Co., Midland, Michigan: a strongly acidic cation exchange resin consisting of a cross-linked copolymer of styrene with divinylbenzene, containing 8% of the latter and containing sulfonic acid groupings as the functional groups), 100–200 mesh size, previously converted to the ammonium form.

The above mentioned solution containing 2.46 mM. of FCDR was chromatographed by bringing the solution onto a column of "Dowex" 50–X8 resin 2.5 x 4 cm. and eluting first with water, and then from fraction No. 39 on with 0.02 N ammonia. Flow rate was about 80 ml. per hour and fractions were taken half hourly. The ultraviolet absorption was measured in samples diluted with 0.1 N HCl at 260, 280 and 300 m$\mu$. The total absorbency at 280 m$\mu$ as well as the ratios 280/260 and 300/280 were as listed in Table I below. Authentic 2'-deoxy-5-fluorocytidine has $\epsilon$=9.55 at 280 m$\mu$ and a ratio 280/260=3.18 and 300/280=0.99. By using these values it was possible to check the purity of the fractions and to calculate FCDR content and $[\alpha]_D$. Fractions were pooled accordingly.

TABLE I

| Fraction | $E_{280}$ | 280/260 | 300/280 | FCDR mM. | FCDR Mg. | $[\alpha]_D^{26}$ | Remarks |
|---|---|---|---|---|---|---|---|
| Starting material. | 23,500 | 2.11 | 0.98 | 2.46 | 606 | +7.5° | |
| 4–9 | 8,450 | 1.78 | 0.91 | 0.875 | 217 | −15.3° | Contains Cl' and deoxyribose derivatives. |
| 10 | 0 | 0 | 0 | | | | |
| 11–19 | 4,750 | 3.0 | 1.02 | 0.495 | 121 | +23° | Free of Cl' and deoxyribose. |
| 20–26 | 2,180 | 2.7 | 0.985 | 0.229 | 56 | +18° | Do. |
| 27–45 | 3,560 | 2.9 | 1.02 | 0.373 | 91 | +7° | Do. |
| 46–47 | 2,050 | 2.3 | 1.0 | 0.215 | 53 | Positive | Do. |

Samples of the pooled fractions 11–19, 20–26, 27–45, and 46–47 were chromatographed on paper using the upper phase of a mixture of ethyl acetate:water:formic acid (12:7:1) (ascending). Only one ultraviolet absorbing spot $R_f$=0.11 was found. Fractions 27–45 showed also a fluorescent spot ($R_f$=0). The FCDR anomer content in the spectrophotometrically fairly pure fractions 11–45 was calculated at 268 mg. Fractions 11–19 when tested as growth inhibitor of Sarcina lutea, Bacillus simplex, Staphylococcus aureus, Escherichia coli, and Bacillus subtilis exhibited an activity corresponding to a 60–80% content of 2'-deoxy-5-fluorocytidine in the anomeric mixture.

The solution obtained by hydrolysis of mixture (A), containing 103 mM. of FCDR, was similarly chromatographed on a "Dowex" 50–X8 (NH$_4$+) resin column, 100–200 mesh, 1 x 25 cm., at a flow rate of 30 ml. per hour, fractions being taken half hourly. Fractions 2–13 contained, according to spectrophotometry, 227 mg. of FCDR, 300/280=1.02, 280/260=2.73, $[\alpha]_D$=+12°.

This brought the total yield of spectrophotometrically identified but not crystallized FCDR anomer mixture to 495 mg.

Example 6.—2'-Deoxy-5-fluorocytidine

To a suspension of 3.27 g. of 5-fluorocytosine-monomercury (containing 9.43 mM. of combined 5-fluorocytosine) in 75 ml. of dimethylformamide there was added with stirring 7.78 g. of 2-deoxy-3,5-di(p-toluoyl)ribofuranosyl chloride (20 mM.). An almost clear solution resulted in ca. 10 minutes. The mixture was heated in a water bath of 40–50° C. for one hour, then cooled to room temperature and filtered. A solution of 10 g. of potassium iodide in 190 ml. of water was added to the filtrate. A gummy precipitate formed. Addition of 150 ml. of ether brought the precipitate into the ether layer. The water phase was again extracted with 150 ml. and then twice with 100 ml. of ether. The combined ether extracts were evaporated and gave a dark oil. This was deacylated by shaking with a mixture of 30 ml. of ethanol and 15 ml. of 2 N aNOH for one hour. A cloudy solution resulted which was rendered Congo acid by addition of 34 ml. of N HCl. After removal of some alcohol by evaporation, the solution was filtered and fiinally concentrated to a volume of 35 ml. Spectrophotometric analysis gave a total $E_{280}$=36800 (see Table II), corresponding to 3.86 mM. of FCDR. Paper chromatography using the system described in Example 5 (i.e. upper phase of ethylacetate:water:formic acid, 12:7:1) disclosed, in addition to FCDR, the presence of one or two slower moving deoxyribosides, of one or two pyrimidine-free deoxyribose derivatives, and of toluic acid.

The solution was put on a "Dowex" 50–X8 (NH$_4$+) column, 100–200 mesh, 2.5 x 44 cm. Elution was performed with water at a flow rate of 150 ml. per hour, fractions being taken half hourly (Table II).

TABLE II

| Fraction | Cl' | $E_{280}$ | 280/260 | 300/280 | FCDR, mM. | $R_f$ values* | | | | |
|---|---|---|---|---|---|---|---|---|---|---|
| Starting material. | + | 36,800 | 2.14 | 1.0 | 3.85 | $0_D^U$ | $.10_D^U$ | $.6_D$ | $.7_D$ | $.96^U$ |
| 3 | + | 7,080 | 1.92 | 0.96 | 0.74 | $0_D^U$ | $.10_D^U$ | $.6_D$ | $.7_D$ | |
| 4 | ± | 18,700 | 2.65 | 1.0 | 1.96 | $0_D^U$ | $.035_D^U$ | $.10_D^U$ | $.6_D$ | $.7_D$ |
| 5 | − | 4,600 | 2.88 | 1.0 | 0.48 | $0_D^U$ | $.10_D^U$ | | | |
| 6 | − | 1,150 | 2.54 | 0.95 | 0.12 | | $.10_D^U$ | | | |

*The index U designates ultraviolet absorbing, the index D designates deoxyribose containing spots. (Deoxyribose test according to Buchanan, Nature 1951, 1091). $0_D^U$ and .035 correspond to "slow-moving deoxyribosides;".$10_D^U$ corresponds to FCDR; $.6_D$ and $.7_D$ correspond to deoxyribose derivatives; .96 corresponds to toluic acid.

For further purification fractions 3 and 4 were again chromatographed. Fraction 3 was evaporated to dryness and the residue obtained was extracted repeatedly by boiling with a total of 75 ml. of ethanol. An alcohol insoluble residue of 1.05 g. containing mostly ammonium chloride and showing no U.V. absorption, was discarded. The alcoholic extract was evaporated to dryness, the residue obtained was dissolved in 10 ml. of water and rendered Congo acid by addition of a few drops of formic acid.

This solution was chromatographed on a "Dowex" 50–X8 ($NH_4+$ form) column, 100–200 mesh size, 2.5 x 44 cm., first with water as eluant, and from fraction 17 on with 0.04 N $NH_3$. Flow rate was 50–70 ml. per hour, fractions being taken half hourly.

TABLE III

| Fraction | Cl' | $E_{280}$ | 280/260 | 300/280 | FCDR, mM. | $R_f$ values* | | | | |
|---|---|---|---|---|---|---|---|---|---|---|
| Starting material. | + | 7,080 | 2.14 | 1.0 | 0.74 | $0_D{}^U$ | $10_D{}^U$ | .6D | .7D | |
| 3 | + | 98 | 1.31 | 0.90 | | | | | | |
| 4 | + | 1,140 | 1.80 | 0.93 | | $.034_D{}^U$ | $.093_D{}^U$ | $.19_D$ | $.58_D$ | $.75_D$ |
| 5 | + | 1,215 | 1.80 | 0.91 | | $.034_D{}^U$ | $.09_D{}^U$ | | $.58_D$ | $.75_D$ |
| 7–29 | − | 1,000 | 1.8 | 0.9 | | | | | | |
| 30 | − | 200 | 1.6 | 1.07 | | | | | | |
| 31 | − | 1,150 | 2.88 | 1.01 | 0.12 | } $0_F$ | $.10_D{}^U$ | | | |
| 32 | − | 1,075 | 2.71 | 0.98 | 0.11 | | | | | |

*U and D as in Table II, index F signifies fluorescent.

Fractions 31 and 32 contained chromatographically fairly pure FCDR. For further purification these fractions were evaporated to dryness and the residue obtained was dissolved in 6 ml. of water. The solution was partly decolorized by stirring with about 100 mg. of "Dowex" 1–X4 (Dow Chemical Co., Midland, Michigan: an anion exchange resin consisting of a cross-linked copolymer of styrene with divinylbenzene [4% of the latter], containing quaternary ammonium groups as the functional groups), 100–200 mesh size, previously converted to the formate form. The solution obtained by filtering from the resin contained 30 mg. of FCDR $[\alpha]_D = -30°$. According to antimicrobial tests, this product contained 25% of β-anomer.

Fraction 4 (Table II) was evaporated to dryness, dissolved in 5 ml. of water rendered Congo acid by addition of 0.2 ml. of 1.0 N formic acid and chromatographed on a column of "Dowex" 50–X8 ($NH_4+$ form), 100–200 mesh size, 2.5 x 44 cm., water being used as eluant, flow rate 80 ml. per hour, fractions being taken half hourly (see Table IV).

TABLE IV

| Fraction | Cl' | $E_{280}$ | 280/260 | 300/280 | FCDR, mM. | $R_f$ values | | | | | $[\alpha]_D$ |
|---|---|---|---|---|---|---|---|---|---|---|---|
| Starting material. | + | 18,700 | 2.65 | 1.0 | 1.96 | $0_D{}^U$ | $.035_D{}^U$ | $.10_D{}^U$ | .6D | .7D | |
| 3 | + | 103 | 1.3 | .79 | | | | | | | |
| 4 | ± | 915 | 1.7 | .93 | | | $.033_D{}^U$ | $.11_D{}^U$ | $.6_D$ | $.7_D$ | |
| 5 | − | 1,540 | 2.2 | .97 | | | | | | | |
| 6 | − | 4,190 | 3.3 | 1.0 | 0.44 | | | $.11_D{}^U$ | | | |
| 7–10 | − | 7,640 | 3.3 | 1.0 | 0.80 | | | $.11_D{}^U$ | | | −0.0 |
| 11–24 | − | 3,230 | 3.2 | 1.04 | 0.35 | | | $.11_D{}^U$ | | | −3.5 |
| 25–43 | − | 550 | 2.8 | 1.03 | 0.06 | | | | | | |

Thus, the total yield of chromatographically and spectrophotometrically acceptable material composed of the fractions listed below was found to be 2.82 mM. of FCDR.

|  | mM. FCDR |
|---|---|
| Table II, fraction 5 | 1.00 |
| Table III, fraction 31–32 | 0.23 |
| Table IV, fraction 6–24 | 1.59 |
| Total | 2.82 |

Fraction 6 (Table IV) was evaporated and the residue was dissolved in 5 ml. of ethanol. Addition of 15 ml. of petroleum ether to the alcoholic solution produced a sticky precipitate. To the solution decanted from the precipitate additional 10 ml. of petroleum ether was added.

A gum precipitated which upon trituration solidified. This was discarded. The mother liquor of this precipitate gave, upon further standing, 25 mg. of crystals, M.P. 168–170° C., which proved to be a not quite pure mixture of FCDR anomers, according to U.V. spectrum and chemical analysis. It contained ca. 50% of β-FCDR, as determined microbiologically.

*Analysis.*—Calculated for $C_9H_{12}FN_3O_4$: C, 44.08; H, 4.92; N, 17.14. Found: C, 44.80; H, 4.80; N, 16.90. $[\alpha]_D{}^{25} = +4.7°$ (c.=0.3 in water).

0.1 N HCl—$\lambda_{max}$. 290 mμ (ε 11800)
0.1 N HCl—$\lambda_{min}$. 249 mμ (ε 2510); 300/280=1.02; 280/260=2.56

Evaporation of fractions 7–10 (Table IV) yielded a colorless glass which was dissolved in 20 ml. of ethanol. Upon gradual addition of 90 ml. of petroleum ether to the solution and standing in the refrigerator, 130 mg. of crystals melting at 167–170° were obtained, which proved to be a fairly pure mixture of FCDR anomers. Microbiological determination gave a 50% β-FCDR content.

*Analysis.*—Calculated for $C_9H_{12}FH_3O_4$: C, 44.08; H, 4.92; N, 17.14. Found: C, 44.54; H, 5.15; N, 16.84, 16.86. $[\alpha]_D{}^{25} = -0.7°$ (c.=0.3 in water).

0.1 N HCl—$\lambda_{max}$. 289 mμ (ε 10700)
0.1 N HCl—$\lambda_{min}$. 248 mμ (ε 1370); 300/280=1.03; 280/260=3.16

*Example 7.—2'-deoxy-5-fluorocytidine*

To a water-free suspension of 3.45 g. of 5-fluorocytosine-monomercury (9.63 mM.) in 130 ml. of toluene there was added with stirring 8.59 g. of 2-deoxy-3,5-di(p-chlorobenzoyl)-D-ribofuranosyl chloride (20 mM.). By heating the mixture gradually to refluxing a part of the solids dissolved. The mixture was refluxed for one-half hour, then was filtered hot from undissolved material (1.54 g., containing unreacted 5-fluorocytosine). The filtrate upon cooling deposited 2.84 g. of crystals, which were filtered and washed with toluene. This solid contained p-chlorobenzoic acid, identified by its melting point of 237–238° C. after washing with potassium iodide and recrystallization from toluene.

The toluene filtrate from the 2.84 g. was washed with 20 ml. of potassium iodide solution (25%), then with 2 x 15 ml. of water, and was evaporated to an oil. This was deacylated by shaking with a mixture of 35 ml. of ethanol and 15 ml. of N NaOH for 1½ hours. Some residual gum was separated by filtration, and the filtrate was rendered Congo acid by addition of 1.35 ml. of concentrated HCl. Chlorobenzoic acid crystallized out, and additional amounts were separated by evaporation and taking up the residue with 25 ml. of water. The final filtrate was extracted twice with 15 ml. of chloroform, partially evaporated in vacuo and chromatographed on a "Dowex" 50–X8 column, 100–200 mesh size ($NH_4+$ form), 2.5 x 42 cm. Elution was effected with water, at a flow rate of from 29 to 38 ml. per hour.

TABLE V

| Fraction | Cl' | $E_{260}$ | 280/260 | 300/280 | FCDR, mM. | $[\alpha]_D^{25}$ |
|---|---|---|---|---|---|---|
| Starting material. | + | 11,450 | 2.39 | 0.99 | | |
| 5-12 | + | 5,740 | 1.06-2.70 | 0.83-0.99 | | |
| 13-33 | − | 4,790 | 2.80 | 1.01 | 0.5 | +13.7° |

Fractions 13–33 contained 0.5 mM. of FCDR in chromatographically purified form.

I claim:
2-chloro-4-amino-5-fluoropyrimidine.

References Cited by the Examiner
UNITED STATES PATENTS 2,688,019 8/54 Hitchings _____ 260—256.4
2,937,171 5/60 Smith _____ 260—251

FOREIGN PATENTS 870,558 3/53 Germany.

NICHOLAS S. RIZZO, Primary Examiner.
WALTER A. MODANCE, Examiner.

UNITED STATES PATENT OFFICE
CERTIFICATE OF CORRECTION

Patent No. 3,185,690                                    May 25, 1965

Robert Duschinsky

It is hereby certified that error appears in the above numbered patent requiring correction and that the said Letters Patent should read as corrected below.

Column 2, lines 26 to 32, formula II should appear as shown below instead of as in the patent:

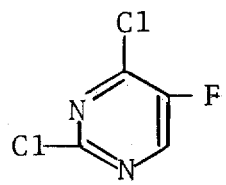

column 4, line 71, for "5-fluorouracial" read -- 5-fluorouracil --; column 6, line 50, for "as" read -- was --; column 8, line 20, for "aNOH" read -- NaOH --; columns 9 and 10, TABLE III, under the column heading "$R_f$ values*", second column, line 1 thereof, for "$10_D^U$" read -- $.10_D^U$ --; same columns, TABLE IV, under the column heading "Fraction", for "Utarting" read -- Starting --.

Signed and sealed this 16th day of November 1965.

(SEAL)
Attest:

ERNEST W. SWIDER                                EDWARD J. BRENNER
Attesting Officer                                 Commissioner of Patents